Sept. 11, 1945. M. C. SCHWAB 2,384,646
COMBINATION COMBAT AND CONSTRUCTION VEHICLE
Filed Feb. 23, 1942 4 Sheets-Sheet 1
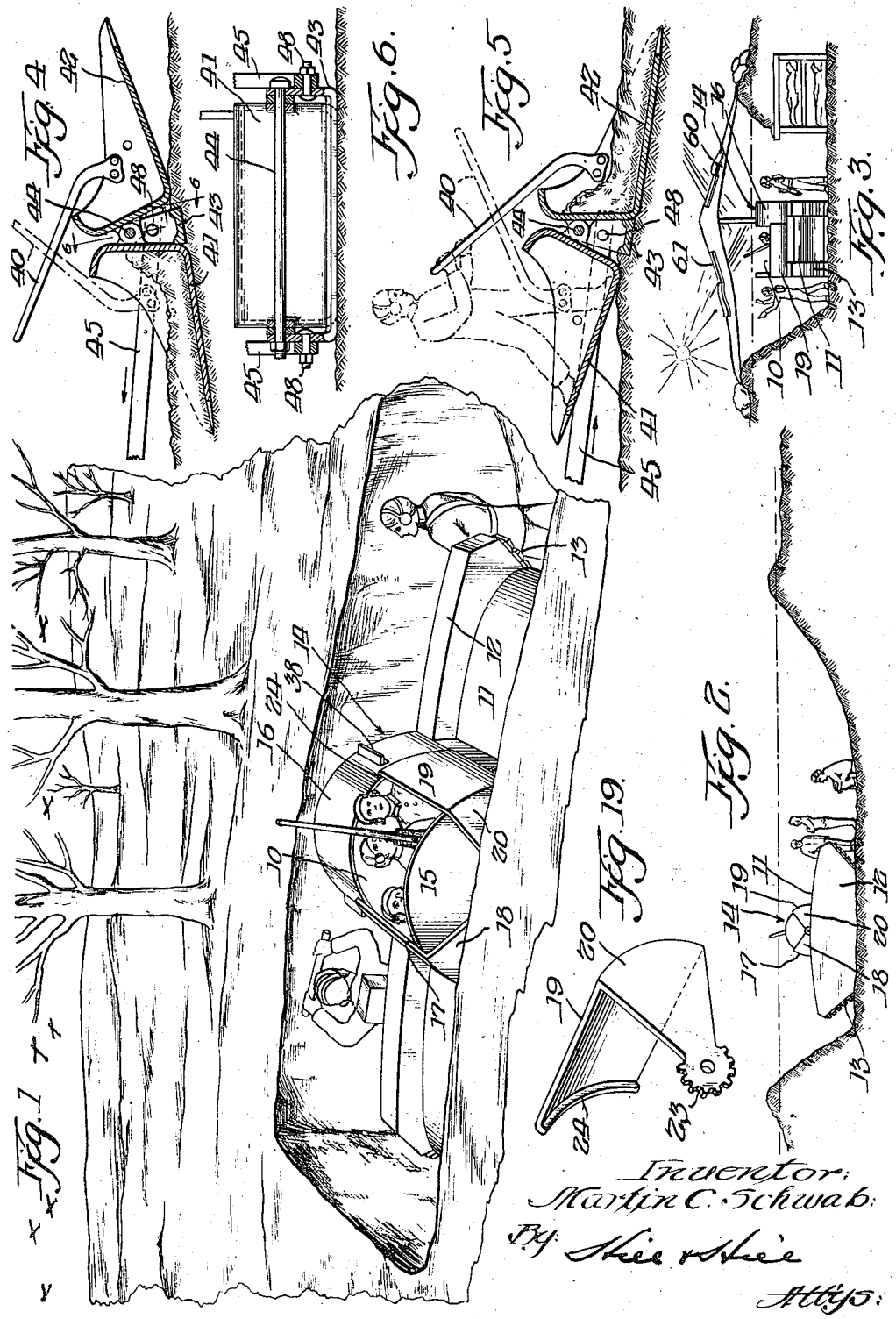
Inventor:
Martin C. Schwab Sept. 11, 1945. M. C. SCHWAB 2,384,646
COMBINATION COMBAT AND CONSTRUCTION VEHICLE
Filed Feb. 23, 1942 4 Sheets-Sheet 2
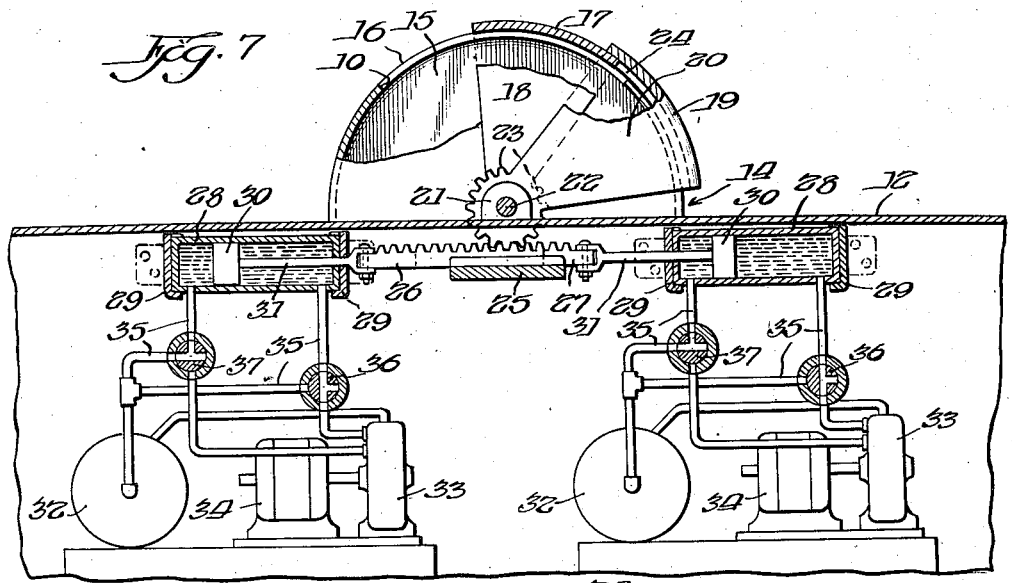
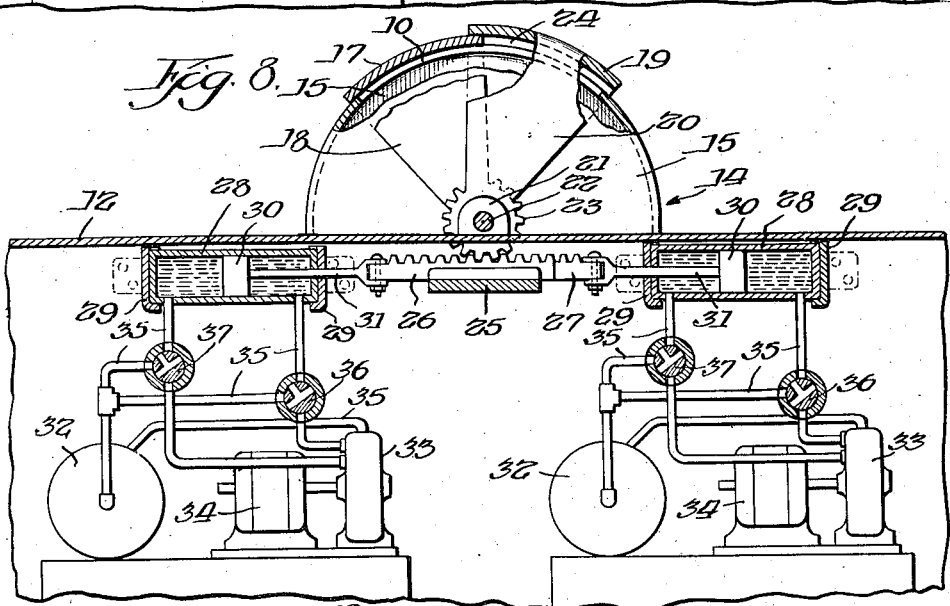
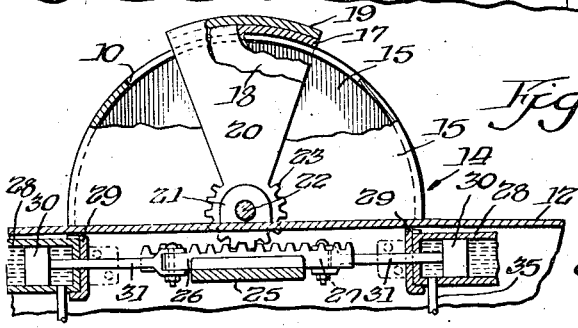
Inventor:
Martin C. Schwab.
By [signature]
Attys.

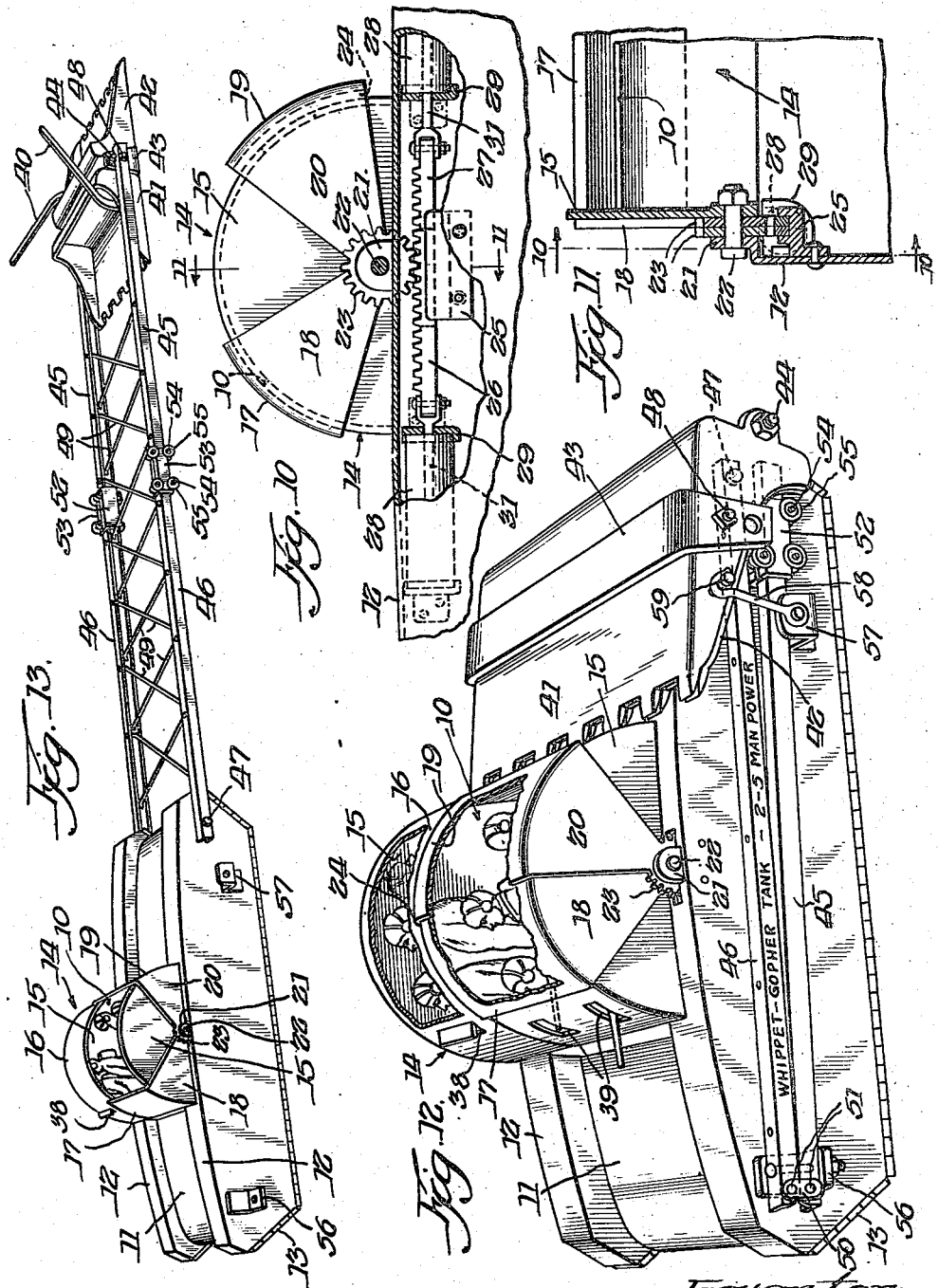

Sept. 11, 1945. M. C. SCHWAB 2,384,646
COMBINATION COMBAT AND CONSTRUCTION VEHICLE
Filed Feb. 23, 1942 4 Sheets-Sheet 4
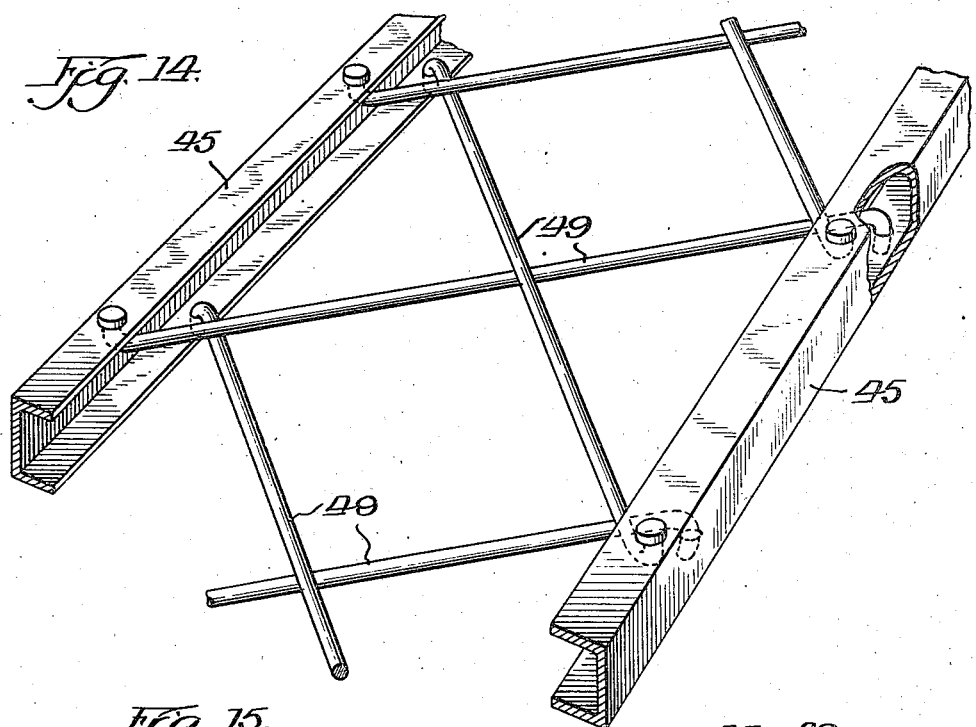
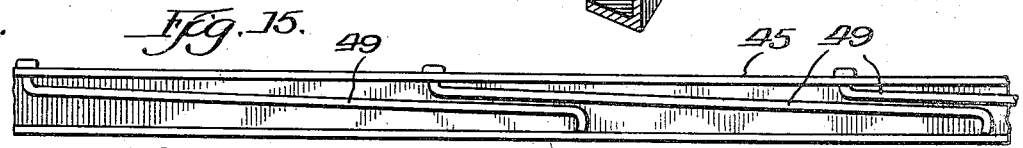
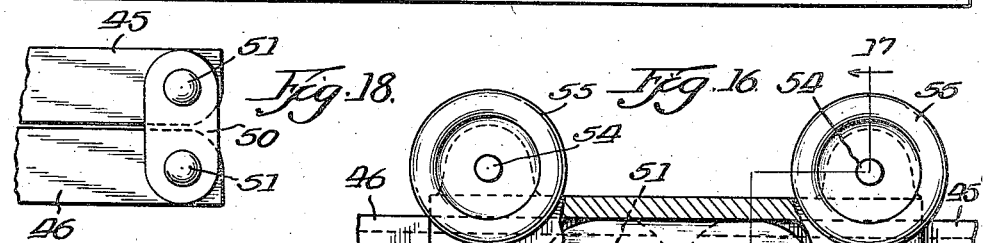
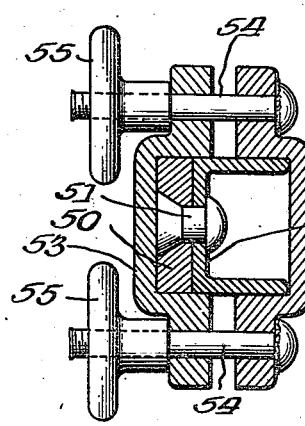
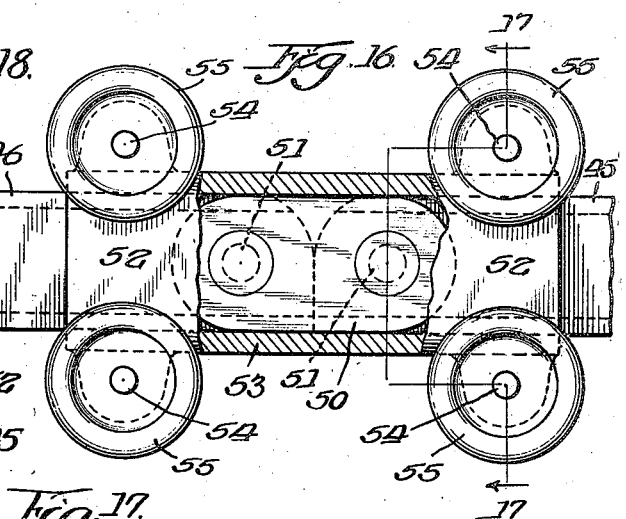

Patented Sept. 11, 1945

2,384,646

UNITED STATES PATENT OFFICE 2,384,646

COMBINATION COMBAT AND CONSTRUCTION VEHICLE

Martin C. Schwab, Chicago, Ill.

Application February 23, 1942, Serial No. 431,923

3 Claims. (Cl. 37—118)

My invention belongs to that general class of devices known as combat vehicles, and more especially a vehicle which may be termed a combined combat and trenching vehicle, particularly designed for repelling aircraft attacks, as well as other attacks, and provided with trenching apparatus whereby the vehicle may be operated to constructe trenchings or depressions for the receiving of the vehicle and for the concealment of the same, together with its crew.

The invention has among its objects the production of a vehicle of the kind described which is new, novel and efficient, which may be produced in quantities quickly and inexpensively.

It has particularly as an object a vehicle having a great many uses both in offensive and defensive warfare, adapted for use singly or with others and with different army, navy and civilian services, such as anti-aircraft, infantry, engineer combat troops, etc., it being impossible to enumerate the great number of uses for which the flexible vehicle is applicable.

The invention has as a further object the production of an armored gun mount or carrier, which is mobile and can be used on shipboard and be moved about the deck, as for example on a battleship or plane carrier, or for power purposes thereon. Likewise, the vehicle may be equipped with flanged wheels for use on railway tracks, so that it may be moved about railway yards, or in connection with troop or freight trains, and employed for towing as well as defending other vehicles.

The device also has as an object the design of vehicle for anchoring, towing and defending observation or other balloons. In use as a construction tool or vehicle, it may be used not only to excavate and assist in various ways, but also defend the construction work and the construction workers.

It has as an additional object the production of a small, light weight, powerful and speedy vehicle which may be advanced or retired without turning about, which may be readily concealed, and in which the crew, guns, and controls are fully protected.

Many other objects and advantages of the construction herein shown and described will be obvious to those skilled in the art from the disclosures herein given.

To this end my invention consists in the novel construction, arrangement and combination of parts herein shown and described, and more particularly pointed out in the claims.

Referring to the drawings, in which like reference characters indicate like or corresponding parts:

Fig. 1 is a perspective view illustrating an intrenching vehicle opened for repelling an attack;

Fig. 2 is a side elevation rather diagrammatically illustrating the vehicle in a cut similar to that shown in Fig. 1;

Fig. 3 is a similar view illustrating the vehicle concealed in one of the cuts;

Fig. 4 is a sectional view of a portion of the intrenching apparatus;

Fig. 5 is a similar view illustrating a different arrangement of the same;

Fig. 6 is a sectional view taken on line 6—6 of Fig. 4;

Fig. 7 is a sectional view through a portion of the vehicle illustrating the closure operating mechanism for the turret, the closure being shown partially open;

Fig. 8 is a similar view illustrating the closed position;

Fig. 9 is a sectional view, showing the closure in control or umbrella position;

Fig. 10 is a side elevation of a portion of the vehicle with portions broken away, as viewed from line 10—10 on Fig. 11;

Fig. 11 is a sectional view substantially on line 11—11 of Fig. 10;

Fig. 12 is a perspective view of one of the vehicles with the intrenching apparatus folded;

Fig. 13 is a similar view on reduced scale showing the trenching apparatus in operative position;

Fig. 14 is a perspective view illustrating details of the hitch for the intrenching tool;

Fig. 15 is a side elevation of one of the bars with the brace members folded;

Fig. 16 is a detail view of a portion of the hitch, showing locking mechanism for the prevention of buckling;

Fig. 17 is a sectional view taken on line 17—17 of Fig. 16;

Fig. 18 is a detail view of the hinge in folded position, and

Fig. 19 is a perspective view of one of the closure members.

Referring to the drawings, I have shown a comparatively small, light weight whippet or gopher tank, as I call it, suitable for a crew of two to five men, which is designed for easy handling or maneuvering, which is substantially adapted for anti-aircraft defense and which is likewise suitable for offensive combat. In a way the same is in the nature of a mobile pill box, as they are termed, which may be moved about to meet changing conditions and which may be operated to quickly dig itself in and provide a place of concealment.

The vehicle illustrated consists of a suitable armored body 11 provided with a housing 12 at each side enclosing movable tracks or treads 13, it being understood that the chassis or running gear may be such as desired and applicable for the purpose. The same is also provided with a power plant and suitable controls which are not shown in detail, the same being of a more or less conventional design which need not be described in detail, other than to say the power plant, transmission, etc., are preferably of a type that the vehicle may be propelled forward or backward without requiring turning around, although being more or less conventioial, it may be controlled and turned around in the customary manner. The controls are fully protected and the pilot or commander can control the vehicle and its armament from the turret, regardless of the direction of travel of the vehicle.

Arranged on the body is a turret 14 which is shown substantially semi-cylindrical in design with the longitudinal axis extending transversely the body and which is provided with a top having an opennig for observation and combat purposes arranged to be covered when desired by a movable top portion. As shown, the turret 14 consists of end walls 15—15 and a top portion 16. A portion of the top 16 is formed with an opening as shown at 10 extending from one end wall toward the other side and which is normally closed by the closures or covers 17 and 19, two closures being shown, which may be moved independently and each of which covers substantially one-half of the opening at the front and back sides. The shape of the turret and closures affords strength and will deflect projectiles and shell fragments. As shown, the cover 17 is provided with a segment 18 and the cover 19 with the segment 20, the inner edges of the closures resting on the top 16 and sliding thereover, the closure 19 sliding or telescoping over closure 17. The segments 18 and 20 are pivotally connected by a bolt 22 or its equivalent to a bracket 21 on the housing (see Fig. 11).

The respective segments 18 and 20 are provided with gear segments 23 which extend through a slot in the top of the housing 12 to the interior of the same. The segments 18 and 20, as before mentioned, carry the outer ends of the covers, while the inner end of cover 17 slides over on the top portion 16. Cover 19 is provided with a flange 24 which rides on and slides over the top 16. In other words, the two covers or tops substantially telescope. They may be moved to open the top entirely, as shown in Fig. 1, or to close the same, as shown in Figs. 8 and 12, or they may be manipulated as shown in Figs. 7 and 9, leaving the desired opening or openings in the top for purposes of observation or for firing through. It will be noted that as shown in this Fig. 9, the pilot and gun crew are fully protected by the top against the elements and also from shell fragments, but have free openings for observation or for firing through. The opening in the top provides for entrance to or exit from the turret. It will be noted that additional openings in the body of the vehicle are not needed, so that the same is well closed against dust and gas attacks.

Arranged on the inside of the wall of the housing 12 is a bracket 25 which slidably carries gear racks 26 and 27 which mesh with the gear segments 23 on the cover segments 18 and 20. For manipulating the racks 26 and 27 to move the covers, I have shown hydraulic mechanism, it being understood that any other suitable mechanism may be employed for the purpose. As shown, there is provided a fluid container 28 for each closure, which container is supported from brackets 29 carried by the housing 12. Arranged within the containers or cylinders 28 are plungers 30 connected by rods 31 to the respective racks 26 and 27. In the embodiment illustrated I provide a fluid tank or container 32, a pump 33 and a power unit 34. The container 32 and pump 33 for each cylinder is connected more or less as indicated by the piping 35, valves 36 and 37 being arranged to control the discharge and admission of fluid to and from the cylinders 28 so that the plungers 30 will be actuated as desired, thereby moving the racks 26 and 27, and moving the covers 17 and 19. By manipulating valves 36 and 37 as desired, fluid may be pumped into the cylinders 28, moving the racks 26—27, thereby moving covers or closures 17 or 19 as indicated in the figures. By shifting the valves, the fluid may be circulated to produce the desired result. With the valves 36 and 37 in the position shown in Fig. 8, the closures may be maintained in a desired position, as for example, in closed position, as illustrated in this figure. Obviously, they may be held in an open or closed position or partially opened or closed.

I have not considered it necessary to show details of the controlling means for the motors 34, since electric switches or the like may be employed, the particular controls depending upon the motive power used for driving the pumps 33. Where there is only one closure, obviously only one mechanism for moving the same may be employed. Where there are two closures, however, as shown, it is preferred to have two mechanisms so that the closures may be independently moved as found desirable. This is desirable in the event one cover should be injured in action, the other may be independently operated.

As most clearly shown in the drawings, see Fig. 12 for example, the turret is provided with the desired number of observation ports 38 and with gun ports 39. The guns may be projected through the ports and through the opening or openings in the top of the turret when the closures are in open or partially open position, as indicated in Fig. 1 or the other figures, and may be retracted when the turret is closed or the vehicle under way. This of course is all incidental to and dependent on service conditions.

As was before mentioned, the particular device shown is adapted to dig a trench when moving forward or when backing up. I have shown a simple form of trenching mechanism consisting of the shovels or scrapers 41 and 42. These are secured to a separator 43 by means of a shaft or bolt 44. They are also provided with operating handles 40 for lifting or lowering the scrapers. The scrapers are shown secured or connected to the vehicle by means of foldable knock down hitch bars 45 and 46. These bars 45 and 46 are arranged, one at each side of the body, as shown, and secured thereto by means of bolts 47 or the equivalents. They are secured to the separator member 43 by means of the bolts 48 and pivotally connected intermediate their ends by plates 50 and bolts or rivets 51 so that they may be folded up. They are also maintained in spaced relation and braced by means of the brace members 49. Each brace member is pivotally secured at one end to a hitch bar and arranged at the opposite end to engage the hitch bar at the opposite side, as is most clearly shown in Fig. 14. They may be folded inside the bars 45 and 46, as shown in Fig. 15, when the hitch bar is to be folded up.

At the hinge joint between the respective bars 46 and 45 are arranged clamping devices which consist of the members 52 and 53 which may be secured together by bolts 54, the hand wheels 55 constituting nuts. The clamping members are arranged to be moved along the bars to enclose the plate 50 when the hitch bar is opened up and in operative relation with the other parts and lock the hitch parts extended, substantially as shown in Fig. 13.

In Fig. 12 the hitch bar is shown folded and the scrapers or shovels which conform to the contour of the body are seated on the body of the vehicle. To fold the device for transporting, the outer ends of the bars 45 are disconnected from the bolts 48 and the spacing member 43 removed from between the two shovels 41 and 42. The clamping members 53 are released and moved toward the free ends of the members 45. The free ends may then be raised up and folded over to overlie the bars 46 and the hitch bar at each side then turned over, as shown in Fig. 12, and rest upon the brackets 56 and 57. The two shovels 41 and 42 may then be positioned on the body as shown in Fig. 12 and the separator 43 laid over the same as shown in the same figure. These may be locked in place by means of the hooks 58 or equivalent means for the purpose. The vehicle then may be moved forward or backward with the trenching apparatus in inoperative position. When it is desired to use the trenching apparatus the device is unfolded and connected up as shown in Fig. 13. In use of the trenching apparatus, when the vehicle is moved forward, as indicated by the arrow in Fig. 4, the shovel 41 will form a trench, and when the vehicle is backed up shovel 42 will dig a trench or deepen the trench previously dug by shovel 41.

In Fig. 2 I have illustrated the vehicle at rest in a trench which has been dug for it, substantially as shown in Fig. 1. Fig. 3 illustrates a cross section of a trench with a vehicle at rest therein and with a cover such as a tarpaulin 60 drawn over the same to conceal it. There may be provided an opening 61 for firing through. Fig. 3 illustrates how the trench might be made with bunks for accommodation of the crew of the vehicle in case it is desired to park the device for a period of time in one spot. It will be obvious that the tarpaulin or cover may be camouflaged so that the anti-aircraft gun is entirely concealed from observation. Obviously, by referring to Fig. 1 it will be seen that the tank is almost entirely concealed in the trench and the vehicle and crew well protected from ground observation and fire.

The present device has many advantages—it is light in weight, compact, and may travel in many places where a heavier and unwieldly combat vehicle or tank could not go. It can wind around among trees and other obstructions, and is small enough that it can be transported on rafts or boats or even on trucks, as well as under its own power. It is low and consequently is not readily visible by an enemy. It can dig its own trench for purposes of concealment and generally is an all-round vehicle, providing a portable pill box machine-gun nest and anti-aircraft gun station. It is applicable for civilian defense or for any construction purpose. It can be driven in either direction, as disclosed in my application Serial No. 429,966.

Having thus described my invention, it is obvious that various immaterial modifications may be made in the same without departing from the spirit of my invention; hence I do not wish to be understood as limiting myself to the exact form, construction, arrangement and combination of parts herein shown and described, or uses mentioned.

What I claim as new and desire to secure by Letters Patent is:

1. In a vehicle of the kind described and in combination, a body mounted to travel forwardly or rearwardly and having a turret thereon arranged more or less centrally between the ends thereof, a scraper and means for detachably hitching the same to the body at each side adjacent one end thereof, said means for hitching the scraper to the body consisting of a pair of spaced foldable bars provided with means for securing one end of each bar to opposite sides of the body and for detachably securing the opposite end of the bar to the scraper, said bars capable of being folded together and swung along the sides of the body, and brackets carried by the sides of the body for supporting the jointed ends of the bars, said scraper substantially corresponding in contour and of a size to substantially overlie and fit the body between one end thereof and the turret.

2. In a vehicle of the kind described and in combination, a body arranged to travel forwardly or rearwardly and having a turret thereon arranged more or less centrally between the ends thereof, a scraper and means for detachably hitching the same to the body at each side adjacent one end thereof, said means for hitching the scraper to the body consisting of a pair of spaced foldable bars provided with means for securing one end of each bar to opposite sides of the body and for detachably securing the opposite end of each bar to the scraper, said bars capable of being folded together and swung along the sides of the body, and brackets carried by the sides of the body for supporting the jointed ends of the bars.

3. In a vehicle of the kind described and in combination, a body, with means for moving the vehicle forwardly or rearwardly, a turret on said body, a pair of oppositely directed scrapers, means for securing said scrapers together and to the body of the vehicle consisting of a knock-down foldable hitch comprising two channel shaped side bars, cross bars foldable into the channels of the side bars, and means for foldably securing said bars together and maintaining them in aligned relation, one end of said hitch pivotally secured to the body and at the other end to said scrapers, one scraper arranged for operating during the forward movement of the vehicle and the other during the rearward movement thereof, said scrapers capable of being nested together, and bracket means on the body for securing said foldable side bars one on each side of the vehicle body when not in use, said nested together scrapers corresponding substantially in contour and of a size to substantially overlie and fit the body between one end thereof and the turret.

MARTIN C. SCHWAB.